United States Patent
Mahmoud et al.

(10) Patent No.: US 8,571,136 B1
(45) Date of Patent: Oct. 29, 2013

(54) ADAPTIVE SYMBOL TRANSITION METHOD FOR OFDM-BASED COGNITIVE RADIO SYSTEMS

(75) Inventors: Hisham A. Mahmoud, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 828 days.

(21) Appl. No.: 12/275,721

(22) Filed: Nov. 21, 2008

Related U.S. Application Data

(60) Provisional application No. 60/989,487, filed on Nov. 21, 2007.

(51) Int. Cl.
*H04K 1/02* (2006.01)
*H04L 25/03* (2006.01)
*H04L 25/49* (2006.01)

(52) U.S. Cl.
USPC ........ 375/296; 375/285; 455/63.1; 455/114.1

(58) Field of Classification Search
USPC ................. 375/285, 296; 370/203, 206, 208; 455/63.1, 114.2, 114.3
See application file for complete search history.

(56) References Cited

U.S. PATENT DOCUMENTS

| | | | |
|---|---|---|---|
| 6,922,388 B1 * | 7/2005 | Laroia et al. | 370/208 |
| 7,133,355 B1 | 11/2006 | Gerakoulis | |
| 7,158,474 B1 | 1/2007 | Gerakoulis | |
| 7,257,166 B2 * | 8/2007 | Kim | 375/260 |
| 7,609,616 B2 * | 10/2009 | Jacobsen | 370/208 |
| 2005/0259567 A1 * | 11/2005 | Webster et al. | 370/208 |
| 2006/0077885 A1 | 4/2006 | Schnell et al. | |
| 2006/0133261 A1 | 6/2006 | Cosovic et al. | |
| 2006/0291375 A1 * | 12/2006 | Nishikawa | 370/210 |
| 2007/0171810 A1 * | 7/2007 | Suda et al. | 370/208 |
| 2007/0201350 A1 * | 8/2007 | Papasakellariou | 370/208 |
| 2009/0041150 A1 * | 2/2009 | Tsai et al. | 375/267 |
| 2011/0096810 A1 * | 4/2011 | Suehiro et al. | 375/130 |

FOREIGN PATENT DOCUMENTS

| | | |
|---|---|---|
| JP | 2004312674 A | 11/2004 |
| WO | 0141387 A1 | 6/2001 |

OTHER PUBLICATIONS

Yamaguchi, H. "Active interference cancellation technique for MB-OFDM cognitive radio." Microwave Conference. 34th European. vol. 2. Oct. 13, 2004. pp. 1105-1108.

Brandes, S.; Cosovic, I.; Schnell, M. "Reduction of out-of-band radiation in OFDM systems by insertion of cancellation carriers." Communications Letters. IEEE. vol. 10. Issue 6. Jun. 2006. pp. 420-422.

(Continued)

*Primary Examiner* — Jean B Corrielus
(74) *Attorney, Agent, or Firm* — Robert J. Varkonyi; Smith & Hopen, P.A.

(57) ABSTRACT

Modulated orthogonal frequency division multiplexing (OFDM) subcarriers generate high sidelobes, resulting in adjacent channel interference (ACI). Current sidelobe suppression techniques, such as inserting guard intervals or cancellation carrier bands, diminish the useful radio spectrum or consume significant wireless device resources. Disclosed is a method of suppressing sidelobes through adding an adaptive extension to OFDM symbols that is calculated to avoid ACI while keeping power consumption to low levels. Bandwidth and user location information are collected by a cognitive radio an utilized to determine the extension used. The method significantly reduces ACI to other bands and reduces the required guard bands, opening the radio spectrum to more efficient use.

20 Claims, 5 Drawing Sheets

(56) References Cited

OTHER PUBLICATIONS

Cosovic, I.; Brandes, S.; Schnell, M. "Subcarrier weighting: a method for sidelobe suppression in OFDM systems." Communications Letters. IEEE. vol. 10. Issue 6. Jun. 2006. pp. 444-446.

Brandes, S.; Cosovic, I.; Schnell, M. "Sidelobe suppression in OFDM systems by insertion of cancellation carriers." Vehicular Technology Conference. 2005. VTC-2005-Fall. 2005 IEEE 62nd. vol. 1. Sep. 28-25. pp. 152-156.

* cited by examiner

PRIOR ART

PRIOR ART

ADAPTIVE SYMBOL TRANSITION METHOD FOR OFDM-BASED COGNITIVE RADIO SYSTEMS

CROSS REFERENCE TO RELATED APPLICATION

This application claims priority to U.S. Provisional Patent Application No. 60/989,487, entitled "Adaptive Symbol Transition Method for OFDM-Based Cognitive Radio", filed Nov. 21, 2007. The contents of which are herein incorporated by reference.

FIELD OF INVENTION

This invention relates to spectrum shaping for cognitive radio applications. Specifically, the invention relates to a method for sidelobe suppression in OFDM-based systems.

BACKGROUND OF THE INVENTION

The increasing use of wireless communication systems for voice-only communications, interactive Internet data, and multi-media applications, as well as higher data rate transmission requirements have consumed much of the available wireless spectrum. Recently, opportunistic usage of Licensed frequency bands have been utilized as a solution to spectral crowding problem by using cognitive radio (CR) systems (J. Mitola and G. Q. Maguire Jr., "Cognitive radio: making software radios snore personal," *IEEE Personal Communications*, vol. 6, no. 4, pp. 13-18, August 1999; T. Weiss and F. K. Jondral, "Spectrum pooling: an innovative strategy for the enhancement of spectrum efficiency," *IEEE Commun. Mag.*, vol. 42, no. 3, pp. 8-14. March 2004). A key point for the success of CRs is the ability to shape its signal spectrum as to achieve minimum interference to licensed users (LUs) operating in the used band. However, to achieve this objective, the system physical layer (PHY) needs to be highly flexible and adaptable. Future technologies will face spectral crowding, and coexistence of wireless devices will be a major problem. Considering the limited bandwidth availability, accommodating the demand for higher capacity and data rates is a challenging task, requiring innovative technologies that can offer new ways of exploiting the available radio spectrum, such as cognitive radio. (Mitola, J. and J. Maguire, G. Q., "Cognitive radio: making software radios more personal," *IEEE Personal Commun. Mag.*, vol. 6, no. 4, pp. 13-18, August 1999).

Multi-carrier techniques, specifically orthogonal frequency division multiplexing (OFDM), are commonly used in modern wireless communications systems and have the potential of fulfilling the requirements of CR. By dividing the spectrum into subbands that are modulated with orthogonal subcarriers, OFDM spectrum can be shaped with more ease compared to other signaling techniques. OFDM utilizes sinc-type pulses to represent symbols transmitted over subcarrier signals, resulting in large sidelobes. These sidelobes may interfere with the signal transmissions of neighboring legacy systems, causing adjacent channel interference (ACI) between the transmissions.

Disabling a set of OFDM subcarriers to create a spectrum null may not be sufficient to avoid interference to LU. Sidelobe suppression is a relatively new field, with only a few sidelobe suppression techniques available. These techniques transmit large volumes of information to the receiver to obtain interference suppression. Techniques include guard bands on both sides of used OFDM spectrum coupled with windowing of the time-domain symbols (T. Weiss, J. Hillenbrand, A. Krohn, and F. K. Jondral. "Mutual interference in OPDM-based spectrum pooling systems," in *Proc. IEEE Veh. Technol. Conf.*, vol. 4, May 2004, pp. 1873-1877), interference cancellation carriers (CCs) (H. Yamaguchi, "Active interference cancellation technique for MB-OFDM cognitive radio," in *Proc. IEEE European Microwave Conf.*, vol. 2, October 2004, pp. 1105-1108; S. Brandes, I. Cosovic, and M. Schnell, "Reduction of out-of-band radiation in OFDM systems by insertion of cancellation carriers," *IEEE Commun. Lett.*, vol. 10, no. 6, pp. 420-422, 2006), or subcarrier weighting (I. Cosovic; S. Brandes, and M. Schnell, "Subcarrier weighting: a method for sidelobe suppression in OFDM systems." *IEEE Commun. Lett.*, vol. 10, no. 6, pp. 444-446, June 2006). CC techniques can significantly suppress OFDM sidelobes, as seen in FIG. 1, but result in an increase in the system peak-to-average-power ratio (PAPR) and the performance is sensitive to the cyclic prefix (CP) size. CC forces the transmitter and/or receiver to undertake significant computational analysis, increase the system complexity and introduce long delays. Moreover, due to the higher power used for the CCs, using this technique affects the spectral flatness of the transmitted signal and can increase the inter-carrier interference (ICI) effect in case of a Doppler spread or a frequency offset error at the receiver. On the other hand, subcarrier weighting method causes an increase in the system bit error rate (BER) and the interference reduction is not as significant as it is with the CC method.

Accordingly, a method for reducing signal interference while maximizing receiver resources is needed in the art.

SUMMARY OF THE INVENTION

A new method, referred to as adaptive symbol transition (AST), is shown to suppress OFDM side-lobes and shape the signal spectrum. Similar to windowing technique, the OFDM symbols are extended in time to reduce the effect of symbol transition. However, instead of using a predefined filter shape, the signal value during the extended time is optimized—based on transmitted data and detected LU bands—to reduce the interference to LUs.

Accordingly, disclosed is a method of reducing interference in radio and wireless communications by utilizing time domain orthogonal frequency-division multiplexing symbols. The orthogonal frequency-division multiplexing symbols are then extended. Based on identified licensed user locations and bandwidths, a symbol extension is selected using linear least squares optimization with quadratic constraint, and the symbol extension is inserted into the orthogonal frequency-division multiplexing symbol. In some embodiments, the method also includes modulating the orthogonal frequency-division multiplexing signal, transforming the orthogonal frequency-division multiplexing signal to a time domain signal, and extending the time domain signal with at least one cyclic prefix. Specific methods utilize N-point inverse fast Fourier transformation to transform the orthogonal frequency-division multiplexing signal to a time domain signal. Certain embodiments of the invention also utilize the time domain cyclic prefix duration as a multiple of symbol duration selected from the group consisting of ¼, ⅛, 1/16, and 1/32. In specific embodiments, a licensed user radio band is examined and upsampled to identify the radio signal properties. The use of the symbol extension produces an apodizing symbol.

In certain embodiments, the linear least squares with quadratic constraint is calculated by determining the Hermitian transpose of licensed user signal spectrum, calculating the mean-squared error for the licensed user signal spectrum using the Hermitian transpose, and optimizing the mean-squared error. In specific embodiments, the mean-squared error is optimized using a singular value decomposition. In some embodiments of the invention, an orthogonal frequency-division multiplexing output signal is generated at a steady power level.

Also disclosed is a method of reducing OFDM symbol interference using window filtering of time domain symbols of an orthogonal frequency multiplex symbol. An OFDM transmission signal, which has undergone windowing, is received and processed into a first windowed value using a window function and offset as determined by a licensed user's location and bandwidth to generate a second windowed value. The time offset period is then determined and a time shift is applied to re-align the time-offset symbol period sample with the symbol sample, thereby re-aligning the second windowed value with corresponding first windowed value. The second windowed value and corresponding first windowed value are summed and converted to phases. In specific embodiments, the windowing function is apodizing.

Certain embodiments of the method include applying a first half of the windowing function to a first half of the time-offset symbol sample and applying a second half of the windowing function to a second half of the symbol sample. In specific embodiments, the summed windowed values and a first half of the symbol sample are exposed to a Fast Fourier transform to un-transform the time-domain signal to a orthogonal frequency-division multiplexing signal.

Also envisioned is a wireless interference suppression module. The module includes a first input adapted to accept time domain orthogonal frequency-division multiplexing symbols, a second input adapted to accept a licensed user location and bandwidth information, and a logic module adapted to extend the orthogonal frequency-division multiplexing symbols. The logic module includes a module adapted to select a symbol extension using a linear least squares with quadratic constraint of the licensed user signal spectrum and a module adapted to insert the symbol extension onto the orthogonal frequency-division multiplexing symbol. Some embodiments of the suppression module also include a cognitive radio engine adapted to examine a radio band for a licensed user. The cognitive radio engine is adapted to upsample a radio signal from the licensed user for identification of the radio signal properties is provided in specific embodiments.

The suppression module may be integrated into a cognitive radio. In specific embodiments, the cognitive radio also includes a module adapted to modulate an orthogonal frequency-division multiplexing signal, a transformation module adapted to transform the orthogonal frequency-division multiplexing signal to a time domain signal, and a module adapted to insert at least one cyclic prefix onto the time domain signal. A N-point inverse fast Fourier transformation are integrated into the transformation module circuitry.

This allows wireless users to exploit available spectrum opportunities and achieve highest possible spectral efficiency while keeping the interference to detected LUs to a minimum.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The disclosed method assumes use of a cognitive radio (CR) system employing OFDM signaling. The CR is assumed to be aware of the surrounding environment and the radio channel characteristics. After scanning the channel, the CR is able to identify LUs operating within the same band (D. Cabric, S. Mishna. and R. Brodersen, "Implementation issues in spectrum sensing for cognitive radios," in *Signals, Systems and Computers*, 2004. Conference Record of the Thirty-Eighth Asilomar Conference on, vol. 1, November 2004, pp. 772-776). The disclosed method is useful for other radio systems or devices employing OFDM signaling. As such, the methods disclosed herein are not limited to specific devices, but applies to any device that utilizes OFDM signaling.

Figure 1:
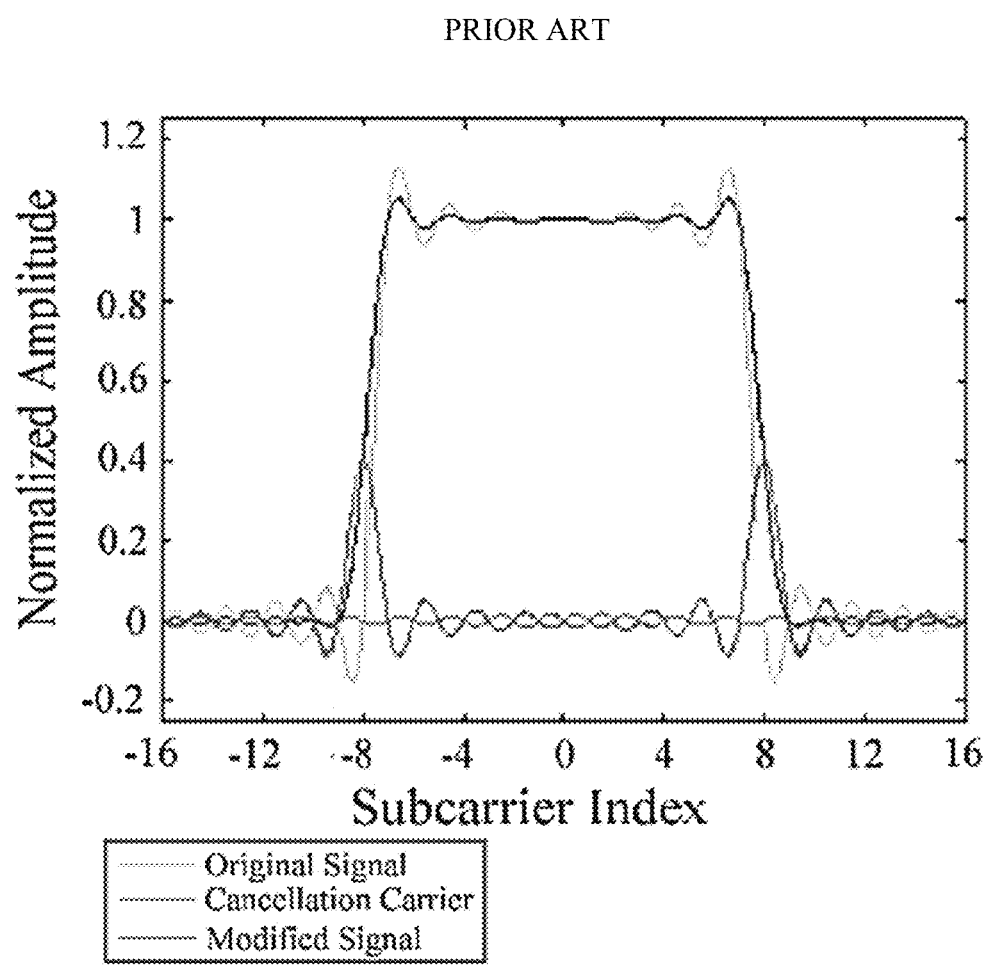
FIG. 1 is a graph of subcarrier amplitudes of OFDM signals before and after modification with cancellation carrier signals.
Figure 2:
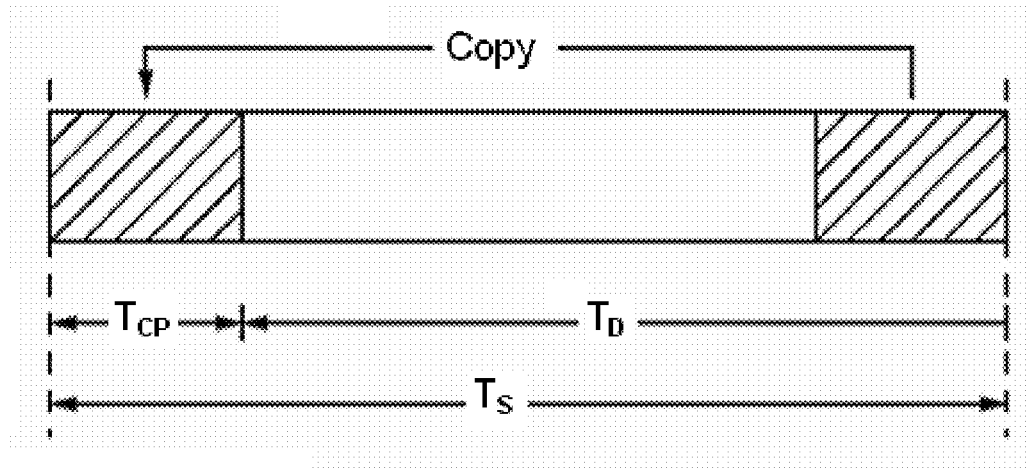
FIG. 2 is an illustration of the cylic prefix extension for OFDM systems.

OFDM signals can be considered as a composition of large number of independent random signals using conventional modulation schemes at low symbol rates. Since the duration of each symbol is long, guard intervals are commonly inserted between the OFDM symbols. The cyclic prefix, which is transmitted during the guard interval, consists of the end of the OFDM symbol copied into the guard interval, and the guard interval is transmitted followed by the OFDM symbol, as seen in FIG. 2. Useful data duration and CP length are represented by $T_D$ and $T_{CP}$ respectively and they make up the total duration of OFDM symbol $T_S$, i.e. $T_S=T_D+T_{CP}$, as shown in FIG. 2.

Figure 3:
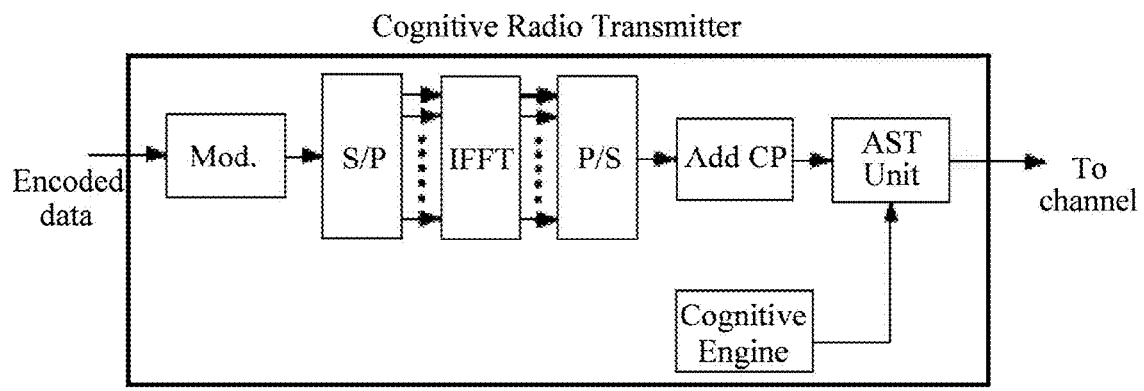
FIG. 3 is an illustrative diagram of a cognitive radio transmitter.

The system model of the cognitive radio is shown in FIG. 3. The encoded data is modulated and fed to an N-point inverse fast Fourier transform (IFFT) unit. $F_{N1 \times N2}=\{F_{n1,n2}\}$ is defined as the $N_1$-point Fourier transform matrix of a vector of length $N_2$, where $$F_{n_1,n_2} = \exp\left(\frac{-j2\pi n_1 n_2}{N_1}\right). \tag{1}$$

The time domain signal at the output of the IFFT is then defined as $$x^{(m)} = \frac{1}{N} F^*_{N \times N} X^{(m)}, \tag{2}$$

where (m) is the symbol index, N is the IFFT size, (.)* is the complex conjugate operator, $$\frac{1}{N} F^*$$

is the inverse Fourier transform matrix, and $X^{(m)}=[X_1^{(m)}, X_2^{(m)}, \ldots, X_N^{(m)}]^T$ is the modulated data vector. The signal is then extended with a CP consisting of G samples. The extended symbols $(Y^{(m)})$ are fed to the AST block. Meanwhile, the cognitive engine passes required information regarding LUs operating in the same band to the AST block. This information is used to suppress the interference—caused by OFDM sidelobes—to LUs as explained below.

Fixed windowing of OFDM symbols has been investigated as a method to suppress OFDM sidelobes (T. Weiss, et al. "Mutual interference in OPDM-based spectrum pooling systems," in *Proc. IEEE Veh. Technol. Conf.*, vol. 4, May 2004, pp. 1873-1877). The time domain symbols passed through a filter (usually raised cosine (RC) filters are used), and consecutive symbols are allowed to overlap. The process smoothes the transition between OFDM symbols and thus improves the spectral characteristics of the OFDM signal. To keep the orthogonality between OFDM subcarriers, the symbols are cyclically extended to cover the overlapping region. The advantage of this approach is its low computational complexity. The disadvantage is the reduced spectral efficiency due to the symbol extension.

Similar to windowing, the AST technique suppresses OFDM sidelobes by extending OFDM symbols and using the extensions to smooth the transition between consecutive symbols. However, instead of using a predefined window shape (e.g., RC), an adaptive method was used that calculates the value of the symbol extension based on LUs location and bandwidth.

Figure 4:
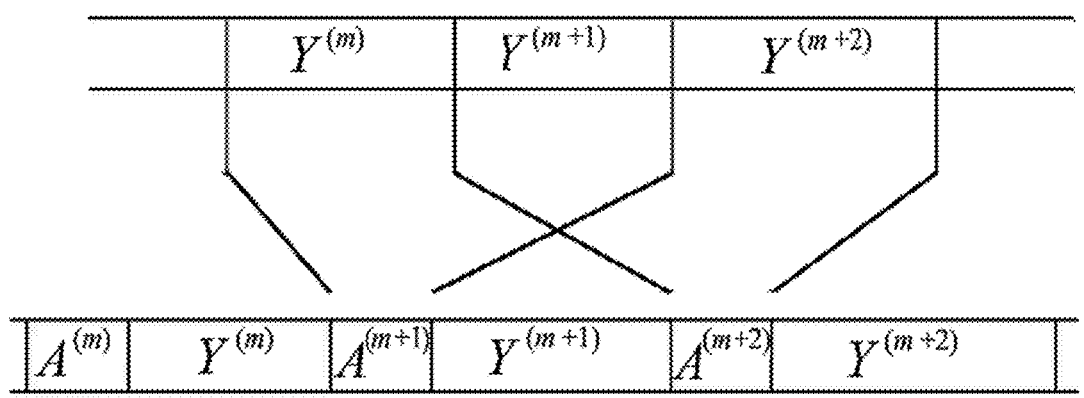
FIG. 4 is a diagram of the adaptive symbol transition output depicting the block extensions added to the orthogonal frequency division multiplexing symbol.

Assume the CR system detects a LU signal spanning over K subcarriers $(X_{i+1}, X_{1+1}, \ldots, X_{i+K})$, where $i\Delta f$ is the licensed signal offset with respect to the OFDM signal, $K\Delta f$ is the licensed signal bandwidth, and $\Delta f$ is the frequency subcarrier spacing. The above subcarrier set is disabled to avoid interfering with the LU. To further suppress the interference, the AST block adds an extension $(A^{(m)}=[A_1^{(m)}, A_2^{(m)}, \ldots A_C^{(m)}]^T)$ to every OFDM symbol $(Y^{(m)})$ as shown in FIG. 4, where C is the number of samples in $A^{(m)}$. $Y^{(m)}$ and $Y^{(m-1)}$ are used to calculate $A^{(m)}$ in the following manner.

First, the interference to the LU is examined. The signal is upsampled by a factor v, or in other words, v points per subcarrier. The signal spectrum of two consecutive symbols is, $$S^{(m)} = F_{vN \times D} \underbrace{\begin{bmatrix} Y^{(m-1)} \\ A^{(m)} \\ Y^{(m)} \end{bmatrix}}_{Z^{(m)}}, \quad (3)$$

where $D=2N+2G+C$. The interference to the LU is then, $$\mathcal{I}_L = F_K Z_K^{(m)}, \quad (4)$$

where $F_K$ is a subset of $F_{vN \times D}$ containing only the rows that corresponds to the LU band (rows $v(i+1)$ to $v(i+K)$) and is the same as $Z_K^{(m)}$ but with $A^{(m)}=[0]_{c \times 1}$. To minimize interference power, the AST block chooses $A^{(m)}$ such that, $$A_{min}^{(m)} = \underset{A^{(m)}}{\arg\min} \|F_I A^{(m)} + \mathcal{I}_L\|^2, \quad (5)$$

where $F_I$ is a subset of $F_K$ containing only the columns that corresponds to $A^{(m)}$ columns N+G to N+C+G−1.

The mean-squared-error (MSE) solution to (5) is, $$A_{min}^{(m)} = -(F_I^H F_I)^{-1} F_I^H \mathcal{I}_L, \quad (6)$$

where $(.)^H$ is the Hermitian transpose. However, (6) can result in very high values. This leads to increase in the signal PAPR. In addition, the useful symbol energy is reduced compared to the total symbol energy resulting in an increase in the system BER. To mitigate this effect, a constraint was added on the minimization in (5) such that the symbol extension power is below a given level $(\alpha^2)$, $$\|A^{(m)}\|^2 \le \alpha^2 \quad (7)$$

The optimization in (5) and (7) is known as linear least squares problem with a quadratic constraint which can be solved using generalized singular value decomposition (W. Gander, "Least squares with a quadratic constraint," *Numerische Mathematik*, vol. 36, no. 3, pp. 291-307, 1980). Fortunately, for a given spectrum shape, $F_I$ is fixed and thus, only $\mathcal{I}_L$ needs to be updated for every OFDM symbol. The computational complexity of the optimization problem is reduced significantly due to this fact.

An important parameter for OFDM systems is the PAPR. By choosing $\alpha^2$ such that, $$\alpha^2 = \frac{C}{N+G} E_S, \quad (8)$$

the signal average power is kept at the same level, where Es is the symbol energy prior to the AST block. Since the AST signal is optimized to smooth the symbol transition, it does not introduce any peaks to the signal and, thus, the PAPR of the system does not increase. On the other hand, the AST reduces the useful symbol energy. Using (8), the worst case signal-to-noise ratio (SNR) loss ($\gamma$) is, $$\gamma = 10 \cdot \log_{10}\left(\frac{E_S + \alpha^2}{E_S}\right) dB, \quad (9)$$

By controlling C and for a fixed PAPR, where (8) is used, the system has a tradeoff between reducing $\gamma$ (reducing C), or improving the interference suppression (increasing C).

It is noteworthy that since AST technique is performed on time-domain symbols, the performance is not sensitive to the CP size. In addition, the AST does not introduce any intersymbol interference (ISI) to the system as the leakage from the symbol extension is contained in the CP. The intended receiver can remove the AST extension along with the CP to maintain an ISI-free signal.

The performance of the proposed method was investigated with computer simulations using an OFDM-based CR system with N=256, G=16. The AST method was used with C=16, v=16, and $\alpha^2=0.06 E_8$ and the DC subcarrier was disabled. Data subcarriers were modulated with a QPSK signal. All results shown were averaged over 10,000 OFDM symbols.

Figure 5:
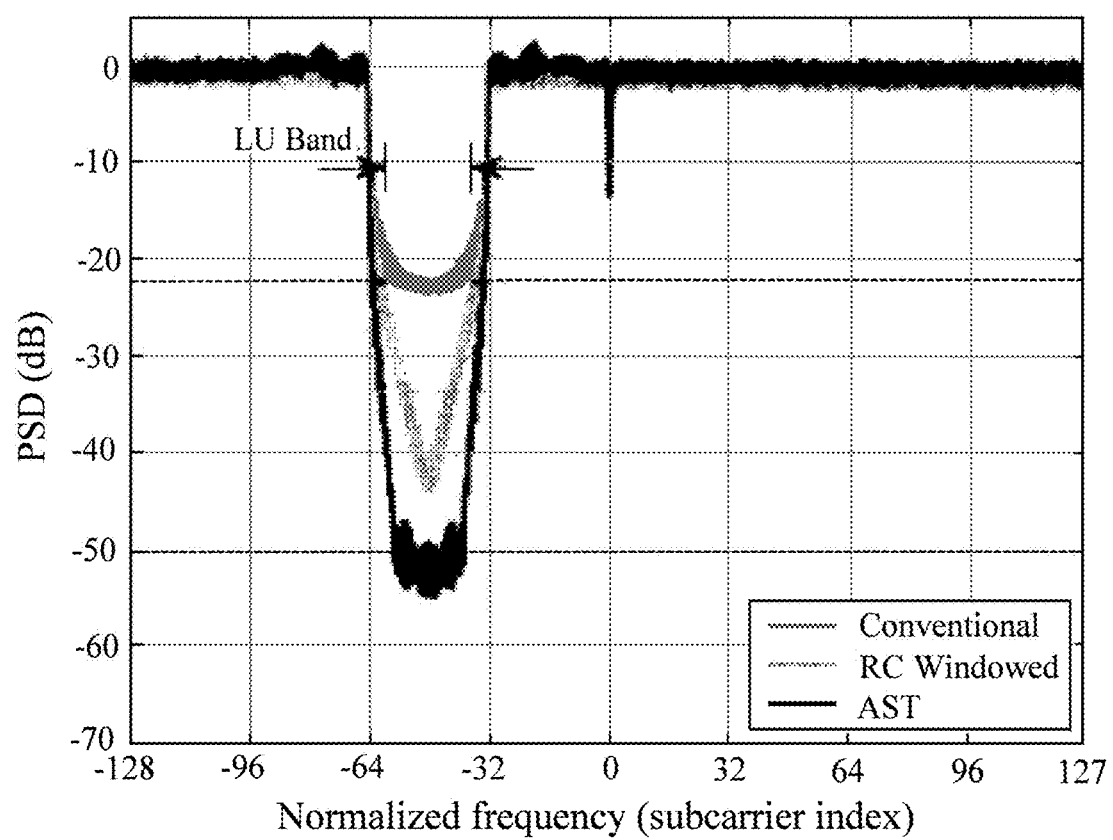
FIG. 5 is a graph of the power spectral density for an orthogonal frequency division multiplexing signal with adaptive symbol transition block with 32 subcarrier gaps.

Two cases were considered for performance evaluation. In the first case, a LU was detected spanning 24 OFDM subcarriers. The system disabled 32 subcarriers leaving a guard band of 4 subcarriers on each side of the LU band. The guard bands were to allow the signal power to decay while the AST block performs the optimization over the 24-subcarrier band. The normalized power spectral density (PSD) of the signal at the output of the AST block was measured, shown in FIG. 5. The system performance was compared with a conventional OFDM system without any symbol extension; and with an OFDM system using RC windowing, and a symbol duration equal to the AST system. The conventional OFDM system suffers an interference level of −22 dB. The RC-windowed system suppressed the interference to −33 dB, while the AST reduced the interference further to less than −50 dB. The AST method achieved a 28 dB gain over conventional systems while keeping the SNR loss, $\gamma \leq 0.25$ dB. Compared to the results presented in (S. Brandes, I. Cosovic, and M. Schnell, "Reduction of out-of-band radiation in OFDM systems by insertion of cancellation carriers," *IEEE Commun. Lett.*, vol. 10, no. 6, pp. 420-422, 2006; I. Cosovic; S. Brandes, and M. Schnell, "Subcarrier weighting: a method for sidelobe suppression in OFDM systems." *IEEE Commun. Lett.*, vol. 10, no. 6, pp. 444-446, June 2006), the AST shows a superior performance in both interference suppression and SNR loss.

Figure 6:
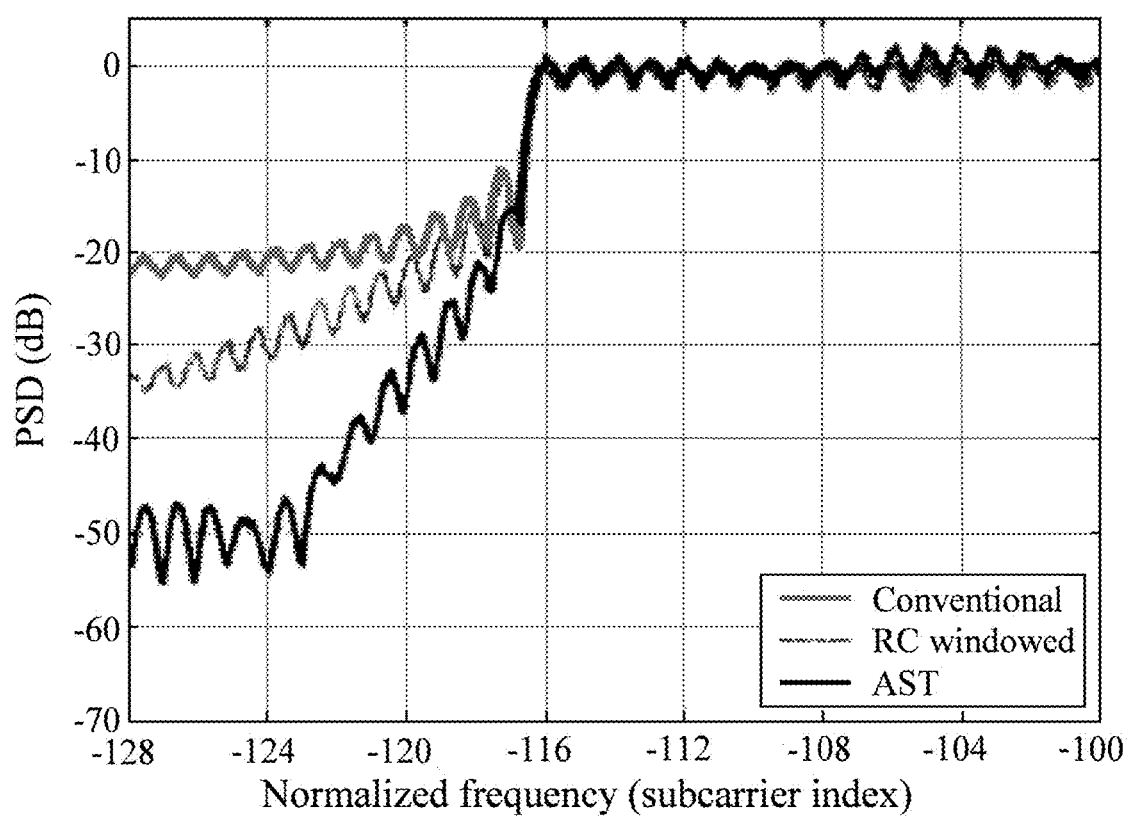
FIG. 6 is a graph of the power spectral density for an orthogonal frequency division multiplexing signal with adaptive symbol transition block with 16 subcarrier guard bands.

Finally, in the second case an AST method was used to reduce the number of disabled subcarriers used as guard bands in current OFDM systems. For example, a WiMAX system employing a 256 subcarriers OFDM system disables 55 subcarriers (28 and 27 on the left and right sides, respectively) to limit out-of-band radiations. Using sidelobe suppression techniques, the required guard band was reduced for an increase in system complexity. 24 subcarriers (12 on each side) as guard bands. N, C, C, u, and $\alpha^2$ were the same as the first case. The normalized PSD of the left side of the signal is shown in FIG. 6. The AST method suppresses the signal power to −50 dB by the end of the in-band signal compared to −32 dB for RC-window method and −20 dB for conventional systems.

A new method to suppress OFDM sidelobes and shape the spectrum of OFDM signals is presented. The proposed AST technique extends the OFDM symbols and uses that extension to reduce ACI to other users operating in the same band. Simulation results show that AST can achieve a significant gain over conventional sidelobe suppression techniques. Moreover, AST does not increase the signal PAPR and keeps a low SNR loss.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of the present invention, it will be apparent to those skilled in the art that variations and modifications are possible without deviating from the broad spirit and principle of the invention. It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of reducing interference in radio communications, comprising the steps of:
    providing at least two time domain orthogonal frequency-division multiplexing symbols;
    extending at least one time domain orthogonal frequency-division multiplexing symbol, wherein the step of extending comprises the steps of:
        identifying at least one licensed user radiowave frequency band, wherein the licensed user radiowave frequency band is examined for interference susceptibility;
        suppressing interference to the licensed user radiowave frequency band using an adaptive symbol transition unit, wherein the suppressing step comprises:
            selecting a symbol extension using a linear least squares with quadratic constraint of the at least one licensed user radiowave frequency band;
            appending the symbol extension onto the at least one time domain orthogonal frequency-division multiplexing symbol to form a cyclic prefix-extended orthogonal frequency-division multiplexing symbol;
            wherein the symbol extension is added as a cyclic prefix in a guard interval of the at least two time domain orthogonal frequency-division multiplexing symbols;
            wherein an extension value of the cyclic prefix is generated based on the licensed user location and bandwidth; and
    generating an orthogonal frequency-division multiplexing radiowave signal consisting of at least one of the cyclic prefix-extended orthogonal frequency-division multiplexing symbol.

2. The method of claim 1, wherein the at least one licensed user radiowave frequency band is examined using the licensed user location and licensed user bandwidth.

3. The method of claim 1, wherein the identification of the at least one licensed user radiowave frequency band further comprises
    upsampling a radio signal from the licensed user radiowave frequency band for identification of the radio signal properties.

4. The method of claim 1, wherein the step of suppressing interference to the licensed user radiowave frequency band further comprises the steps of:
    transferring encoded data of the orthogonal frequency-division multiplexing signal to a modulating unit;
    modulating the encoded data of the orthogonal frequency-division multiplexing signal;
    converting the modulated ODFM into at least one time domain symbol using an N-point inverse fast Fourier transform and outputting the at least one time domain symbol;
    extending the time domain symbol by appending a cyclic prefix to the time domain symbol; and
    transferring the extended time domain signal to the adaptive symbol transition unit.

5. The method of claim 1, wherein the linear least squares with quadratic constraint comprises the step of:
    determining the Hermitian transpose of a licensed user radiowave signal spectrum;
    calculating the mean-squared error for the licensed user radiowave signal spectrum using the Hermitian transpose; and
    optimizing the mean-squared error.

6. The method of claim 5, wherein the mean-squared error is optimized using a singular value decomposition.

7. The method of claim 1, wherein the orthogonal frequency-division multiplexing radiowave signal consisting of the at least one of the cyclic prefix-extended orthogonal frequency-division multiplexing symbol is generated at a steady power level.

8. The method of claim 1, wherein the cyclic prefix has a duration that is a multiple of symbol duration selected from the group consisting of ¼, ⅛, 1/16, and 1/32.

9. The method of claim 1, wherein the symbol extension produces an apodizing symbol.

10. A wireless interference suppression module, comprising:
 a first input adapted to accept time domain orthogonal frequency-division multiplexing symbols;
 a second input adapted to accept a licensed user location and bandwidth information;
 a logic module adapted to extend the time domain orthogonal frequency-division multiplexing symbols, wherein the logic module comprises:
  an adaptive symbol transition unit adapted to select a symbol extension using a linear least squares with quadratic constraint of the licensed user signal spectrum and to insert the symbol extension onto the time domain orthogonal frequency-division multiplexing symbols wherein an extension value of the symbol extension is generated based on the licensed user location and bandwidth and
 an output adapted to deliver the symbol extended time domain orthogonal frequency-division multiplexing symbols.

11. The suppression module of claim 10, wherein the suppression module is integrated into a cognitive radio.

12. The suppression module of claim 11, further comprising a cognitive radio engine adapted to examine a radiowave frequency band for the licensed user.

13. The suppression module of claim 12, wherein the cognitive radio engine is adapted to upsample the radiowave frequency band from the licensed user for identification of the radiowave frequency band's properties.

14. The suppression module of claim 11, wherein the cognitive radio further comprises:
 a module adapted to modulate an orthogonal frequency-division multiplexing signal;
 a transformation module adapted to transform the orthogonal frequency-division multiplexing signal to a time domain signal in electrical communication with the module adapted to modulate the orthogonal frequency-division multiplexing signal; and
 a module adapted to insert at least one cyclic prefix onto the time domain signal in electrical communication with the module adapted to transform the orthogonal frequency-division multiplexing signal;
 wherein the module adapted to insert at least one cyclic prefix is in electrical communication with the first input of the wireless interference suppression module.

15. The suppression module of claim 14, wherein N-point inverse fast Fourier transformation are integrated into the transformation module.

16. A method of suppressing spectral side lobes in radio communications, comprising the steps of
 modulating an orthogonal frequency-division multiplexing signal;
 transforming the modulated orthogonal frequency-division multiplexing signal to a time domain orthogonal frequency division multiplexing symbol signal;
 extending the time domain orthogonal frequency division multiplexing symbol signal with at least one cyclic prefix in an at least one guard interval to form a modified time domain orthogonal frequency-division multiplexing symbol signal;
 extending the modified time domain orthogonal frequency-division multiplexing symbol signal with an adaptive extension using an adaptive symbol transition unit, wherein the step of extending the modified time domain orthogonal frequency-division multiplexing symbol signal comprises the steps of:
  identifying a licensed user location and bandwidth;
  selecting a symbol extension using a linear least squares with quadratic constraint of the licensed user location and bandwidth;
  inserting the selected symbol extension onto the at least one guard interval of the modified time domain orthogonal frequency-division multiplexing symbol signal; and
 outputting the modified time domain orthogonal frequency-division multiplexing symbol signal containing the adaptive extension.

17. The method of claim 16, wherein the step of identifying a licensed user location and bandwidth further comprise:
 examining the radio band for a licensed user; and
 upsampling a radio signal from the licensed user for identification of the radio signal properties, wherein the radio signal properties include the licensed user location and bandwidth.

18. The method of claim 16, wherein the orthogonal frequency-division multiplexing signal is transformed to the time domain symbol signal using N-point inverse fast Fourier transformation.

19. The method of claim 16, wherein the linear least squares with quadratic constraint comprises the step of:
 determining the Hermitian transpose of the licensed user signal spectrum; and
 calculating the mean-squared error for the licensed user signal spectrum using the Hermitian transpose.

20. The method of claim 16, wherein the modified time domain orthogonal frequency-division multiplexing symbol signal containing the adaptive extension is outputted at a steady power level.

* * * * *